United States Patent [19]

Roffman et al.

[11] Patent Number: 5,650,837
[45] Date of Patent: Jul. 22, 1997

[54] ROTATIONALLY STABLE CONTACT LENS DESIGNS

[75] Inventors: Jeffrey H. Roffman; Timothy A. Clutterbuck, both of Jacksonville; Yulin X. Lewis, Ponte Vedra Beach; Edgar V. Menezes, Jacksonville, all of Fla.

[73] Assignee: Johnson & Johnson Vision Products, Inc., Jacksonville, Fla.

[21] Appl. No.: 433,740

[22] Filed: May 4, 1995

[51] Int. Cl.$^6$ .................................. G02B 5/23
[52] U.S. Cl. .............. 351/161; 351/160 R; 351/160 H; 351/174; 351/176
[58] Field of Search .................. 351/161, 160 R, 351/160 H, 174, 176

[56] References Cited

U.S. PATENT DOCUMENTS

| | | |
|---|---|---|
| 4,095,878 | 6/1978 | Fanti ........................... 351/161 |
| 4,573,774 | 3/1986 | Sitterle ......................... 351/176 |
| 5,020,898 | 6/1991 | Townsley ..................... 351/161 |
| 5,125,729 | 6/1992 | Mercure ....................... 351/161 |
| 5,455,641 | 10/1995 | Hahne et al. ................. 351/161 |

FOREIGN PATENT DOCUMENTS

WO9423327  10/1994  WIPO.

*Primary Examiner*—Georgia Y. Epps
*Assistant Examiner*—Jordan Schwartz

[57] ABSTRACT

Non-ballasted, eyelid rotationally stabilized designs are disclosed for use in toric or multifocal toric contact lenses. The back surface of the lens includes a toric or multifocal toric surface and also thin top and bottom zones (slab offs) to achieve eyelid rotational orientation and stabilization. The advantage of this technical approach is in mold manufacturing, wherein the design allows the use of any chosen power spherical stock front mold.

6 Claims, 1 Drawing Sheet

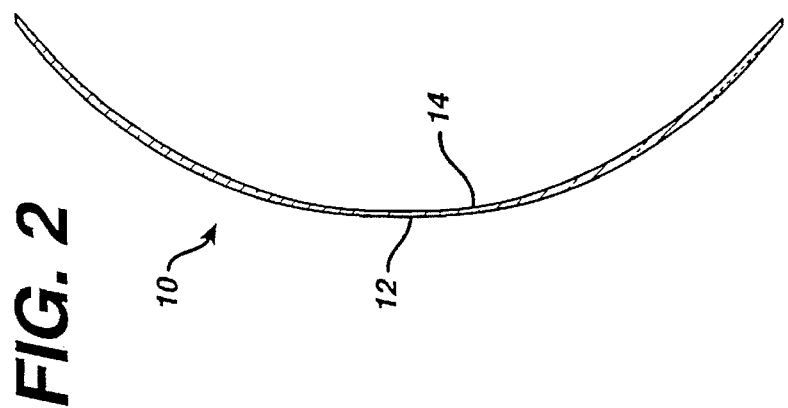
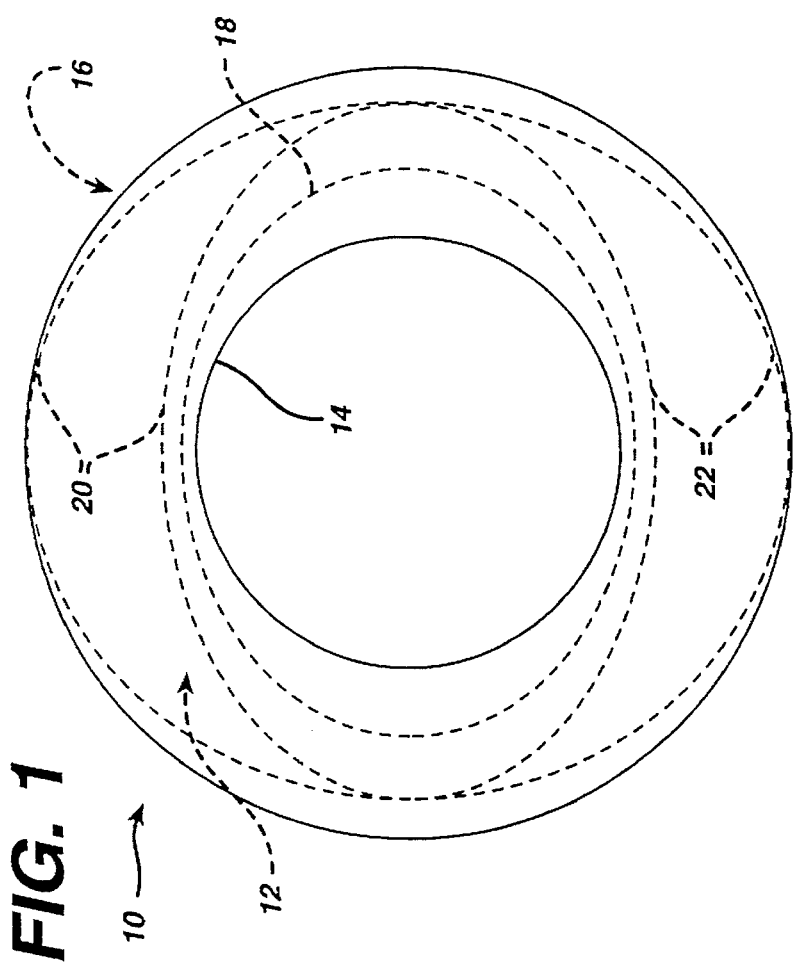
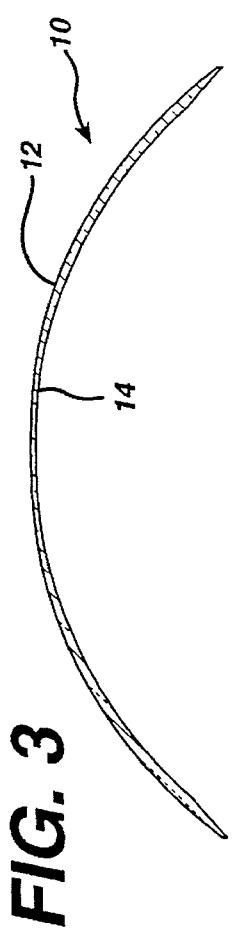

ROTATIONALLY STABLE CONTACT LENS DESIGNS

BACKGROUND OF THE INVENTION

1. Field of the Invention

The present invention relates generally to rotationally stable contact lens designs, and more particularly pertains to non-ballasted, eyelid rotationally stabilized contact lens designs for use in toric or toric multifocal contact lenses.

2. Discussion of the Prior Art

Toric contact lenses using front surface stabilization schemes are well known in the prior art. These front surface stabilized toric contact lenses fall principally into two general known types. In a first general type, the front surface or optic zone of the contact lens is translated downwardly relative to the back surface center, which creates a thinner superior portion and a thicker, ballasted inferior portion known as a prism. In the second general type, both the superior and inferior portions of the front surface of the contact lens are thinned with slab-off areas, which provides for eyelid stabilization thereof, and the toric curve may be placed on the front or back surface of the contact lens as desired.

SUMMARY OF THE INVENTION

Accordingly, it is a primary object of the present invention to provide rotationally stable contact lens designs.

A further object of the subject invention is the provision of non-ballasted, eyelid rotationally stabilized designs for use in toric or multifocal toric contact lenses.

A further object of the present invention is to provide a rotationally stable platform for a toric or multifocal toric contact lens. The design uses thin top and bottom zones (slab offs) on the contact lens back surface to achieve eyelid rotational orientation and stabilization.

The advantage of this technical approach is in mold manufacturing, wherein the design allows the use of any chosen power spherical stock mold or multifocal spherical stock mold or toric stock mold or multifocal toric stock mold.

The present invention can also utilize an "Intermediate Transition Zone on Lid Stabilized Contact Lens" as disclosed in U.S. patent application Ser. No. 08/433,739.

In accordance with the teachings herein, the present invention provides a nonballasted, eyelid rotationally stabilized contact lens wherein one of the front and back surfaces defines a spherical surface or a multifocal spherical surface and the other surface defines a toric surface or multifocal toric surface, and the back surface of the lens is shaped to provide top and bottom slab off areas to rotationally and positionally stabilize the axis of the toric surface relative to the eye. In different embodiments, the front surface defines a spherical or spherical multifocal or toric or toric multifocal surface corresponding to a basic prescriptive spherical optical power for the wearer.

In a preferred embodiment, the back surface defines a toric optical surface for the correction of astigmatism and top and bottom slab off areas which thin the top and bottom portions of the lens. The toric surface is centered about a toric axis which is positionally and rotationally oriented and stabilized in the eye by the top and bottom slab off surfaces by contact with the top and bottom eyelids.

In an alternative embodiment, the present invention provides a nonballasted, eyelid rotationally stabilized contact lens with a toric front surface, for the correction of astigmatism, the axis of which must be rotationally and positionally stabilized relative to the eye. The back surface defines a spherical or spherical multifocal optical surface corresponding to a basic prescriptive spherical optical power for the wearer with top and bottom slab off areas in the lenticular area which thin the top and bottom portions of the lens.

In greater detail, the top and bottom slab off surfaces are in a lenticular, nonoptical area of the contact lens. In some embodiments, the contact lens can comprise a soft hydrogel contact lens.

BRIEF DESCRIPTION OF THE DRAWINGS

The foregoing objects and advantages of the present invention for rotationally stable contact lens designs may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 1 illustrates a plan view of the front surface of a toric contact lens having a rotationally stable design pursuant to the teachings of the present invention;

FIG. 2 illustrates a vertical sectional view through the toric contact lens illustrated in FIG. 1; and FIG. 3 illustrates a horizontal sectional view through the toric contact lens illustrated in FIG. 1.

DETAILED DESCRIPTION OF THE DRAWINGS

In the present invention, the stabilization system is placed on the posterior or back surface of the lens. This technical approach offers advantages in a molded manufacturing system in which a top and bottom thin zone of the contact lens is generated by the use of a flat slab on the peripheral curve on the outer superior and inferior surface of the lens/mold tool.

A separate type of metal tool/mold is required for each different toric optical power and also for each different orientation of the toric cylindrical axis of the contact lens, which are required to accommodate different patients with different amounts of astigmatism along different axes. These tools/molds are used to cast molded plastic molding parts, which are inventoried and used to cast or mold contact lenses as required. With such an inventorying system, a series of cylinder axis/cylinder power combinations are accumulated and stored in inventory. The molds used for the back surface of the contact lens of the present invention are then mated with standard stock spherical or multispherical or toric or multitoric front molds of desired optical powers to produce the final desired toric contact lens.

Referring to the drawings in detail, FIG. 1 illustrates a plan view of the front surface 12 of a toric contact lens 10 having a rotationally stable design pursuant to the present invention.

Toric contact lenses have a cylindrical optical surface/power which is used to correct for astigmatism in a wearer. Statistically, astigmatism occurs in people primarily around either the horizontal axis or the vertical axis, but could occur at any orientation. Accordingly, different toric lenses are required for each different toric optical power and also for each different orientation of the toric cylindrical axis of the contact lens, which are required to accommodate different patients with differing amounts of astigmatism along different axes.

Accordingly, the inventoried plastic molding parts include a number of different combinations of toric axis location and toric optical power. One significant advantage of the present invention is that each of the many types of inventoried plastic molding parts can be used in combination with any inventoried standard spherical or spherical multifocal stock plastic molding part, or any standard toric or toric multifocal stock plastic molding part to create a contact lens having a desired distance optical power. In such a contact lens, the slab off stabilization surfaces are placed on the posterior or back surface of the contact lens.

Referring to FIG. 1, front surface 12 of the lens defines a spherical surface 14 corresponding to the basic spherical distance correction of the patient's prescription. The back surface 16 of toric contact lens 10 has an elliptically shaped toric optic zone 18, which can be surrounded by an optional transition zone, which is surrounded by a lenticular zone which does not have an optical function, in which the top and bottom thin slab off areas 20, 22 are formed. The top and bottom thin slab off areas 20, 22 are contacted by the top and bottom eyelids, which urge the contact lens into a position in which the toric axis is in the correct position for a particular patient. The outer edge of the lenticular region can be beveled at the outer edge of the contact lens.

FIGS. 2 and 3 illustrate respectively vertical sectional and horizontal sectional views through the toric contact lens 10 illustrated in FIG. 1. In one exemplary designed embodiment, the lens had a back curve radius of 7.484 mm at the center, a back curve radius of 8074 mm at intermediate positions, a back curve radius of 8.981 mm at the peripheral radius, a cylindrical radius of 7.307 mm, and a slab off radius of 8.178 mm. This exemplary design results in a thinning of the toric contact lens at the top and bottom slab off areas 20, 22 for eyelid stabilization.

While several embodiments and variations of the present invention for rotationally stable contact lens designs are described in detail herein, it should be apparent that the disclosure and teachings of the present invention will suggest many alternative designs to those skilled in the art.

What is claimed is:

1. A nonballasted, eyelid rotationally stabilized contact lens with a toric optical surface, the axis of which must be rotationally stabilized relative to the eye comprising:

a. said contact lens having a from surface and an opposite back surface;

b. said front surface defining a spherical surface corresponding at least to a patient's basic prescriptive spherical optical power, and said back surface defining a toric optical surface for the correction of astigmatism which is centered about a toric axis;

c. wherein the lens is positionally and rotationally stabilized in the eye by top and bottom slab off surfaces in the back surface of the lens which thin the top and bottom portions of the lens for rotational positional orientation and stabilization by the top and bottom eyelids.

2. A nonballasted, eyelid rotationally stabilized contact lens as claimed in claim 1, wherein the front surface defines a single spherical surface.

3. A nonballasted, eyelid rotationally stabilized contact lens as claimed in claim 1, wherein the front surface defines a multifocal spherical surface.

4. A nonballasted, eyelid rotationally stabilized contact lens as claimed in claim 1, wherein the toric optical surface comprises a toric multifocal optical surface.

5. A nonballasted, eyelid rotationally stabilized contact lens as claimed in claim 1, wherein the top and bottom slab off surfaces are in a lenticular, nonoptical area of the contact lens.

6. A nonballasted, eyelid rotationally stabilized contact lens as claimed in claim 1, wherein the contact lens comprises a soft hydrogel contact lens.

* * * * *

UNITED STATES PATENT AND TRADEMARK OFFICE
CERTIFICATE OF CORRECTION

PATENT NO. : 5,650,837
DATED : July 22, 1997
INVENTOR(S) : Jeffrey H. Roffman et al.

It is certified that error appears in the above-identified patent and that said Letters Patent is hereby corrected as shown below:

Column 4, Line 7, please delete "from" and insert --front--.

Signed and Sealed this

Fourteenth Day of October, 1997

Attest:

BRUCE LEHMAN

Attesting Officer

Commissioner of Patents and Trademarks